US012794869B2

(12) United States Patent
Maitheen et al.

(10) Patent No.: US 12,794,869 B2
(45) Date of Patent: Nov. 10, 2026

(54) UNIFIED AGENT CONTROL OF MULTIPLE PLATFORMS

(71) Applicant: Wells Fargo Bank, N.A., San Francisco, CA (US)

(72) Inventors: Haroon Rasheed Maitheen, New River, AZ (US); Srinivasa Gupta Vudathv, Chandler, AZ (US); Selva Karthik Gantharuban, Chandler, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 71 days.

(21) Appl. No.: 18/935,210

(22) Filed: Nov. 1, 2024

(65) Prior Publication Data

US 2026/0129035 A1 May 7, 2026

(51) Int. Cl.
*H04L 9/40* (2022.01)
*H04L 65/1069* (2022.01)

(52) U.S. Cl.
CPC .......... *H04L 63/08* (2013.01); *H04L 65/1069* (2013.01)

(58) Field of Classification Search
CPC ............................ H04L 63/08; H04L 65/1069
See application file for complete search history.

(56) References Cited

U.S. PATENT DOCUMENTS 8,917,855 B1 * 12/2014 Narayanaswamy .. H04M 7/006 379/265.09
9,118,657 B1 * 8/2015 Shetty ................. H04L 63/0884
10,135,974 B1 * 11/2018 Liu ................... H04M 3/42161
12,204,683 B2 * 1/2025 Williamson ........ H04M 3/5133
2006/0109976 A1 * 5/2006 Sundaram ........... H04M 3/5237 379/265.02
2014/0359462 A1 * 12/2014 Khalil .................... G06Q 10/10 715/738
2016/0099931 A1 * 4/2016 Nethi ................. H04L 63/0815 726/8

(Continued)

OTHER PUBLICATIONS

Lin P, Menon S, Patel S, Lin L. Single Sign-On for multiple unified communications applications. InWorld Congress on Internet Security (WorldCIS-2012) Jun. 10, 2012 (pp. 110-116). IEEE. (Year: 2012).*

*Primary Examiner* — Trang T Doan
*Assistant Examiner* — Ethan V Vo
(74) *Attorney, Agent, or Firm* — SCHWEGMAN LUNDBERG & WOESSNER, P.A.

(57) ABSTRACT

Systems and techniques may generally be used to receive, at a server, from an agent device of an agent, a first login request to access a first routing platform separate from the server. An example technique may include authenticating the agent device, requesting a first session start with the first routing platform, receiving, from the first routing platform, a first response, and sending to the agent device a first indication that the first login is complete. The example technique may include receiving, from the agent device, a second login request to access a second routing platform separate from the server and separate from the first routing platform, requesting a second session start with the second routing platform, receiving, from the second routing platform, a second response to the second session start request, and sending, to the agent device, a second indication that the second login is complete.

19 Claims, 6 Drawing Sheets

(56) References Cited

U.S. PATENT DOCUMENTS

| | | | | |
|---|---|---|---|---|
| 2017/0149867 | A1* | 5/2017 | Lee | H04W 12/06 |
| 2017/0374050 | A1* | 12/2017 | Wood | H04L 67/02 |
| 2022/0217236 | A1* | 7/2022 | Roytblat | G10L 15/22 |
| 2025/0337839 | A1* | 10/2025 | Shimberg | H04M 3/4365 |
| 2025/0348683 | A1* | 11/2025 | Deeb | G06F 40/35 |
| 2026/0052143 | A1* | 2/2026 | Rajshekar | H04L 63/0838 |

* cited by examiner

UNIFIED AGENT CONTROL OF MULTIPLE PLATFORMS

BACKGROUND

Contact centers are widely used in many industries. For example, a customer may call to a call center of a customer service and be connected to an agent. In order to route the call from the customer to the agent, the contact center uses an interaction routing system. A contact center having more than one interaction routing platform needs to establish independent integration with each interaction routing platform. Also, an agent of the contact center having more than one interaction routing platform needs to be trained to handle the unique interactions of each routing platform (e.g., the agent uses an application to interact with each routing platform).

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques described herein provide a user (e.g., an agent) with a seamless interaction with a unified agent control interface while connecting across multiple routing platforms. For example, a user may be unaware of which routing platform is being used after logging into the unified agent control interface. The systems and techniques described herein may use a single user interface to control more than one interaction routing platform based on different technologies for call control and agent control. The single user interface may preserve functionality (e.g., data translation) of the underlying platform for a seamless customer service experience. The systems and techniques described herein improve user experience (e.g., an agent, a plurality of agents) by making user interaction seamless across two or more routing platforms independent from each other. For example, each supported platform may have a similar or different kind of technology (e.g., Five9®, Genesys Cloud CX™, Cisco®, Nice inContact®, Amazon Connect®). The systems and techniques described herein provide a common framework to handle interactions (e.g., voice call, email, chat), via two or more varied interaction routing platforms, delivered to a user interface at an agent device.

Figure 1:
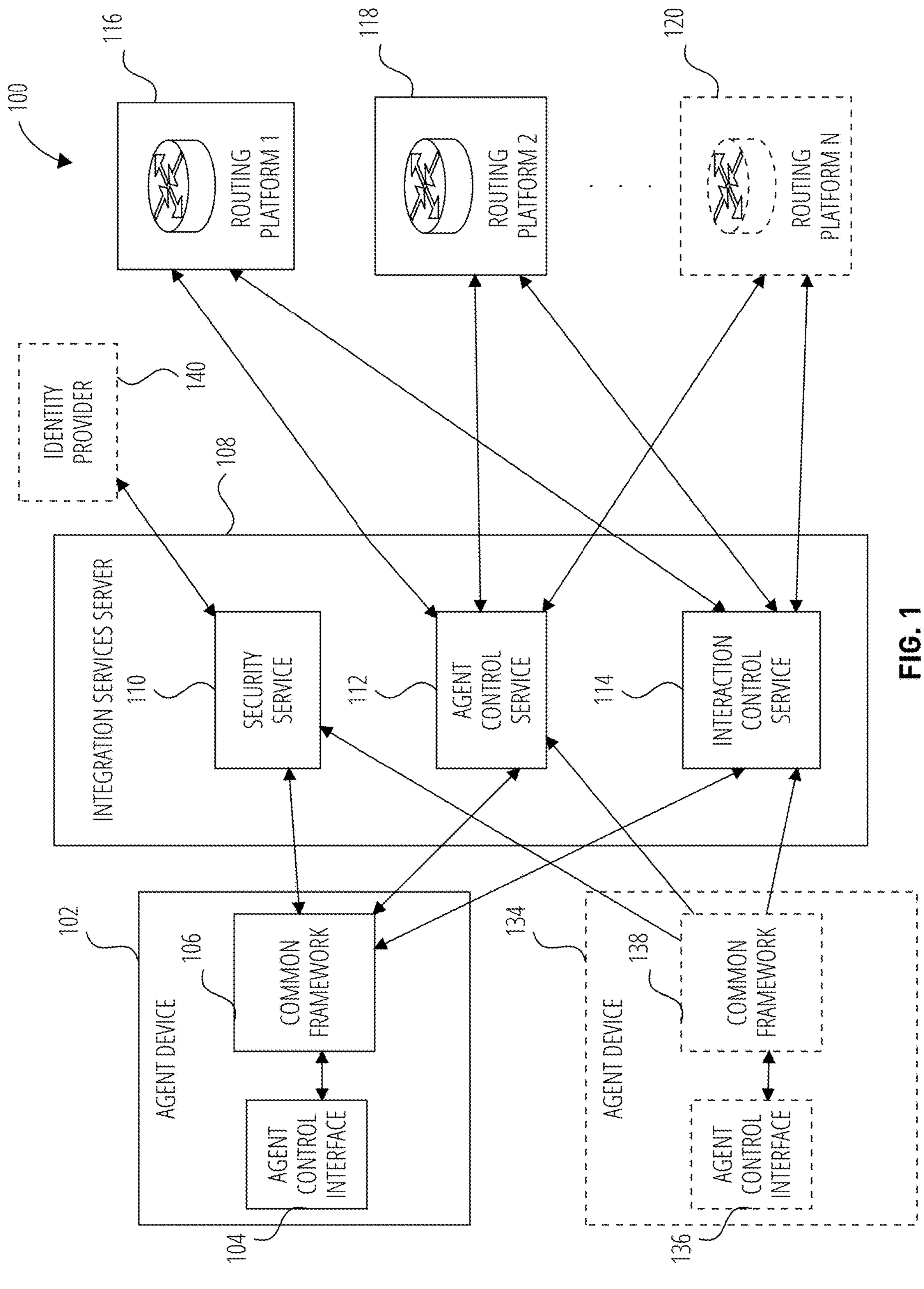
FIG. 1 is a schematic diagram of components of a unified agent control system according to some examples.

FIG. 1 illustrates a schematic diagram 100 of components of a unified agent control system. The schematic diagram 100 may be used for exchanging data across multiple routing platforms in accordance with various embodiments. The schematic diagram 100 includes an agent device 102, an integration services server 108, and two or more routing platforms (e.g., a first routing platform 116, a second routing platform 118, an n routing platform 120) separate from each other and separate from the integration services server 108.

The unified agent control system may include two or more routing platforms (e.g., a first routing platform 116, a second routing platform 118, an n routing platform 120). Each routing platform of the two or more routing platforms may be based on a different technology (e.g., an intelligent call routing, an omnichannel routing, an AI-powered routing, a skills-based routing, a queue management routing, an interactive voice response (IVR) routing, workforce management integration, or real-time adaptive routing). Each routing platform of the two or more routing platforms may include a respective protocol stack or method (e.g., a protocol or method for initiating a call, sending a message, updating an agent status, etc.) within a common framework 106. A protocol stack may include a layered set of communication protocols (e.g., WebSocket, Hypertext Transfer Protocol (HTTP), Hypertext Transfer Protocol (HTTPS), WebRTC) used to implement a full range of networking functionality. A method may be provided by the common framework 106 (e.g., a framework including a JavaScript SDK) to encapsulate the protocol (e.g., authentication and session handling, an event listener for various Contact Center as a Service (CCaaS) events, media handling, data exchange methods for chat or other real-time features), including an Application Programming Interface (API). In order to include an additional routing platform to the unified agent control system, a protocol stack or a method corresponding to the additional routing platform may be added to the common framework 106.

In an example, each routing platform of the two or more routing platforms are separate from the integration services server 108 and separate from other routing platforms of the two or more routing platforms.

In various examples, the agent control interface 104 interacts with the common framework 106 to start an agent activity (e.g., an agent login, a change of an agent state) at the agent device 102. The agent device 102 may be a computing device which may be, but is not limited to, a desktop, a personal computer (PC), a workstation, a mobile device, a tablet, a laptop, or another device that an agent uses to communicate over a network. The agent device 102 may be connected to a routing platform (e.g., the first routing platform 116, the second routing platform 118, the n routing platform 120) of the unified agent control system.

The agent device 102 may be a plurality of agent devices. In an example, the agent device 102 is a plurality of agent devices, and each agent device of the plurality of agent devices is connected to a routing platform of the two or more routing platforms. An agent using the agent device 102 may have an agent level or may belong to a group agent that has an agent group level. The agent level may be based on an individual performance, a skill, or an agent activity (e.g., a tier one frontline agent, a tier two specialized agent, a tier 3 expert agent, or a supervisor level) within a contact center or a support environment. The group level may be based on collective performance, dynamics, and management of a team of agents.

The agent control interface 104 at the agent device 102 may be a single user interface (UI) regardless of which routing platform the agent device 102 is connected to or attempting to connect to. In an example, the agent using agent device 102 interacts seamlessly with the unified agent control interface 104 at the agent device 102 without connecting to the underlying platform directly. In some examples, the unified agent control interface 104 may be presented such that details regarding the underlying platform or even which underlying platform are not displayed or provided in the unified agent control interface 104. The use of a single UI (e.g., the unified agent control interface 104) to interact with any routing platform of the two or more routing platforms may allow an agent to be skilled across more than one routing platform. For example, the agent may be able to manage calls and synchronize agent status between the routing platforms for routing decisions accordingly without needing separate training for each platform. The unified agent control system may provide dynamic service translation between the interaction routing platforms. The unified agent control system may be dynamic (e.g., the system may be configured in different ways to adapt to different user needs) based on a custom configuration (e.g., a user may tailor a component or a behavior of the system according to a specific need or preference).

The common framework 106 may implement an event listener for real-time updates from the CCaaS platform (e.g., an incoming call or a chat request).

The common framework 106 may provide a set of APIs that define how the agent device 102 can interact with the underlying service. An API may include a RESTful API, allowing the agent device 102 to send an HTTP request to perform operations like retrieving data, sending a message, or handling agent authentication. The common framework 106 may support a communication protocol (e.g., Web Real-Time Communication (WebRTC)) for handling a voice call or a video call, for example, directly from a web application, such as without needing an additional plugin.

In an example, the agent device 102 sends, to the integration services server 108, an agent login request to login to the agent control interface 104 for accessing a routing platform. The integration services server 108 may use an agent control service 112 to complete the agent login to the unified agent control system. The integration services servers 108 may include a security service 110, the agent control service 112, and an interaction control service 114.

The security service 110 may be a Single Sign-On (SSO) security service (e.g., using an Active Directory® service) that allows an agent device (e.g., agent device 102) to access multiple applications (e.g., multiple tools and applications within a contact center ecosystem) using a single set of credentials. The security service 110 may be connected to an identity provider (IdP) 140 (e.g., Azure Active Directory®, OpenID® Connect (OIDC), or the like). The IdP 140 may work with the security service 110 to manage the agent device 102 (or agent 134, for example) authentication and authorization in a secure manner.

In an example, the agent device 102 may send a login request (e.g., a SSO login request) to the integration services server 108. In response to receiving the login request for the agent device 102, the integration services server 108 may authenticate, using the security service 110, the agent device 102 (e.g., an Active Directory Federation Services® (ADFS) verifies the agent credential against an Active Directory® database).

The security service 110 may redirect the login request to the IdP 140 for authentication. The agent device (e.g., 102) may send an agent credential to the IdP 140. In response to verifying the agent credential, the IdP 140 may generate an authentication token. The IdP 140 may sign, using cryptographic techniques, the authentication token to ensure integrity and authenticity. The IdP 140 may send the authentication token to the security service 110. The security service 110 may verify the authentication token (e.g., by checking the signature and expiration).

The authentication token may include an agent identity and an agent access permission. The integration services server 108 may respond to the agent device 102 with the authentication token.

The agent control service 112 at the integration services server 108 may manage agent activities and agent statuses. The agent control service 112 may allow an agent to adjust their availability (e.g., ready, not ready, busy, on break) on the agent control interface 104. The agent control service 112 may assign or update an agent level. The agent control service 112 may balance customer interactions across available agents at the unified agent control system.

The agent login to an agent control interface (e.g., agent control interface 104) to handle interactions on a designated routing platform, for example, is an agent activity managed by the agent control service 112. In an example, after receiving the response including the authentication token for agent device 102, the agent device 102 may send a login request including the authentication token to the agent control service 112 at the integration services server 108. In response to receiving the login request from the agent device 102, the agent control service 112 may determine the routing platform to which to connect the agent device 102. In an example, the agent control service 112 determines the routing platform to which the agent device 102 is to be connected based on an agent level of the agent using the agent device 102 or a group level of the agent (e.g., based on a preestablished configuration at the user level or at the group level). In an example, the agent control service 112 determines that the routing platform to which the agent device 102 is to be connected is the first routing platform 116. In this example, the agent control service 112 may interact with the first routing platform 116 and the common framework 106 at the agent device 102 to complete the agent login.

In an example, after receiving the response including the authentication token for agent device 102, the agent device 102 may send, to the agent control service 112 at the integration services server 108, a login request including the authentication token and identifying to which routing platform the agent device 102 is to be connected to.

The interaction control service 114 may manage and orchestrate agent interactions (e.g., answer call, transfer a call) across various communication channels (e.g., voice, chat, message, email, social media). The interaction control service 114 may direct a customer interaction to the correct agent device (e.g., agent device 102) based on one or more specified rules. The interaction control service 114 may organize or prioritize incoming customer interactions.

In an example, agent device 102 is connected to a first routing platform 116. The agent device 102 may determine that an inbound call is designated to a second agent using a second agent device 134. In an example, the second agent device 134 is connected to the second routing platform 118. In response to determining that the call is designated to the second agent device 134, the agent device 102 sends a call transfer request through the common framework 106 to the interaction control service 114 at the integration services server 108. The interaction control service 114 may execute a required command with the first routing platform 116 to initiate a transfer of the inbound call over to the second agent device 134 on the destination second routing platform 118 via a respective public carrier. The agent device 102 may transfer, via the common framework 106, the inbound call with associated key-value pairs or a contact attached variable. In response to the call transfer being initiated, the common framework 106 at the agent device 102 may execute a respective command set recognized by the first routing platform 116 to terminate the agent session with the agent device 102. The interaction control service 114 may intermediate all interactions between the common framework 106 at the agent device 102 and first routing platform 116 and second routing platform 118 during the inbound call transfer. The agent device 102 may encrypt an interaction command before sending the interaction command to the integration services server 108. The second agent device 134 may include an agent control interface 136 and a common framework 138.

In response to the second agent device 134 accepting the transferred voice call, the integration services server 108 may interact with interaction control service 114 to execute required commands with the second routing platform 118 to accept the transferred inbound call.

In response to the second agent device 134 terminating the inbound call on the second routing platform 118, the integration services server 108 may interact with interaction control service 114 to execute a respective command set recognized by the second routing platform 118 to terminate the call session with the second agent device 134.

Figure 2:
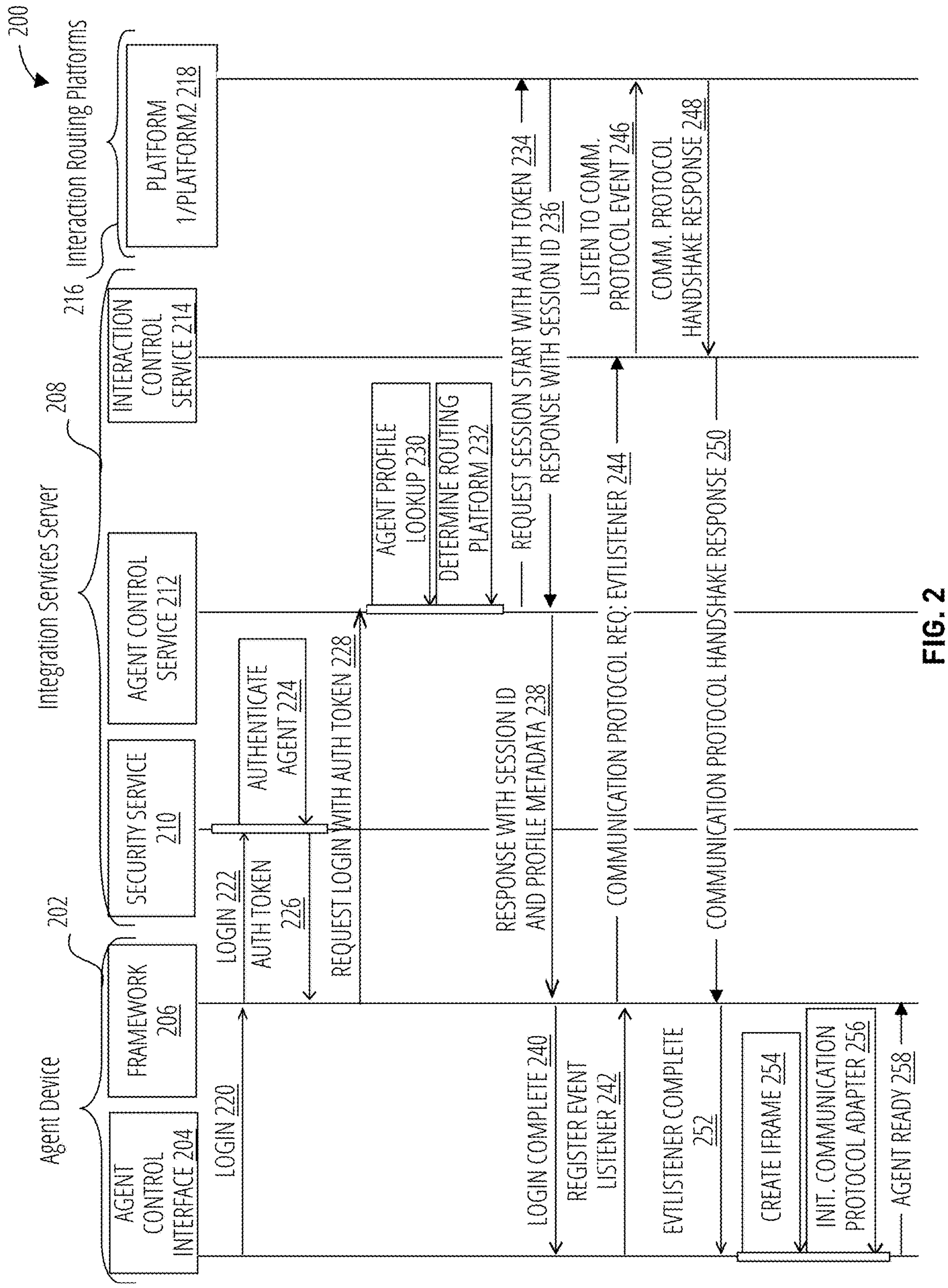
FIG. 2-3 illustrate flowcharts showing a workflow that may be executed, for example, in the environment of FIG. 1, according to some examples.
Figure 3:
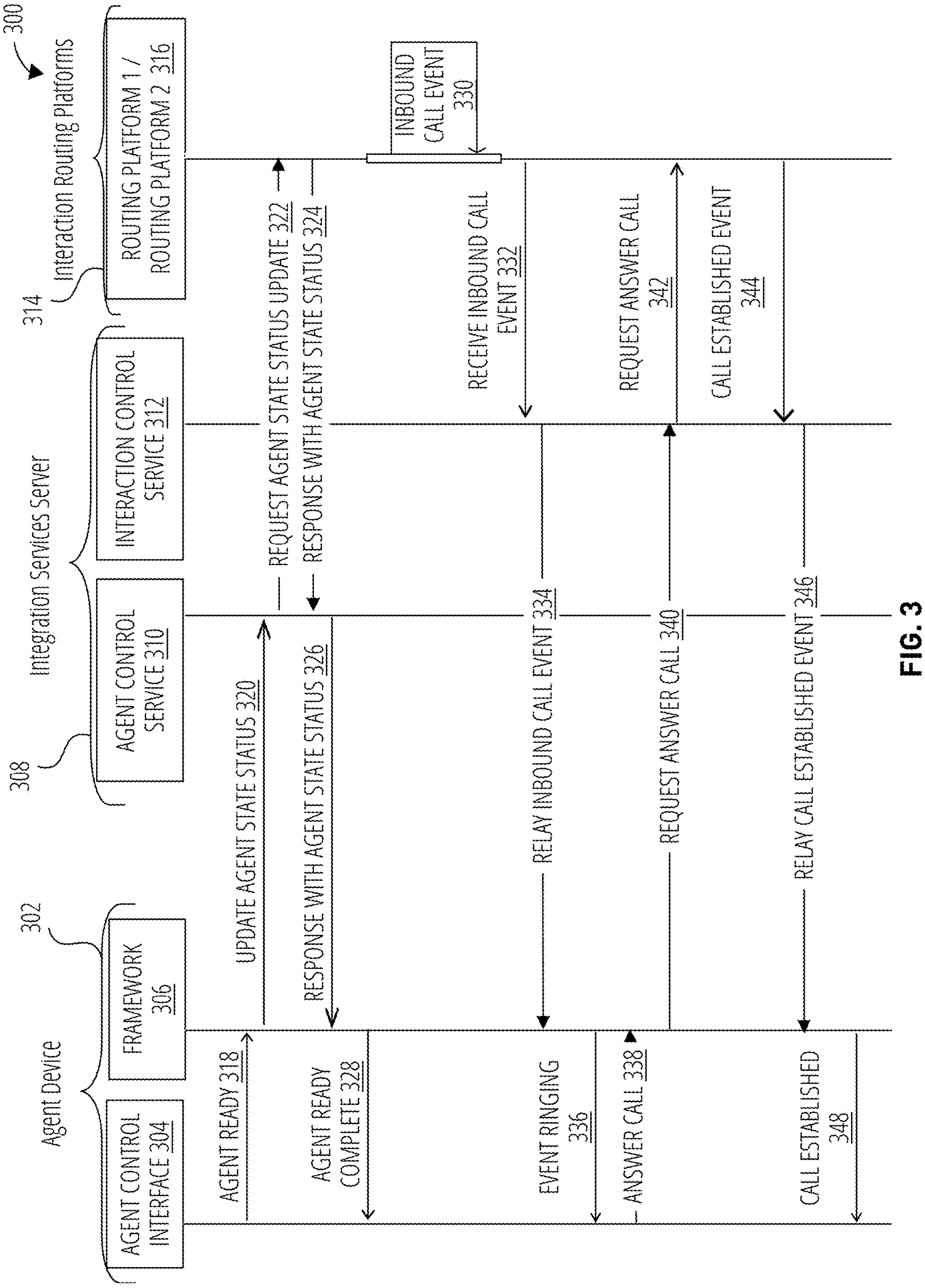

FIG. 2 includes an agent device 202, an integration services server 208, and two or more interaction routing platforms 216 separate from the integration services server 208 and separate from each other. FIG. 2-3 are shown having one or more interfaces, frameworks, services, or other components operating at a device, server, or platform. These one or more interfaces, frameworks, services, or other components are shown for ease of understanding, but one of ordinary skill in the art will appreciate that an operation of one of the one or more interfaces, frameworks, services, or other components may be performed by a different interface, framework, service, etc. An interface, framework, service, or component may be omitted, substituted, combined, or changed at a device, server, or platform without deviating from the techniques described herein.

In an example, as part of a login flow, an agent device 202 (e.g., a telephone device, computer device, smartwatch, tablet, or the like) initiates an interaction (e.g., a login activity 220, a change of an agent state) using the agent control interface 204. The agent device 202, using the common framework 206 (e.g., a framework including a JavaScript Software Development Kit (SDK)), may send a login request 222 (e.g., a Single Sign-On (SSO) login) to a security service 210 (e.g., Active Directory (AD)) at the integration services server 208.

The common framework 206 may handle interactions (e.g., voice call, e-mail, chat) between one or more agent devices (e.g., agent device 202) and two or more routing platforms 216. The common framework 206 may enable and house a set of features (e.g., options that enable call or interaction handling) regardless of the underlying routing system source. The common framework 206 may translate and interpret an interaction command of an end user to a respective command or event recognized by the underlying interaction routing system (e.g., a routing platform of the two or more routing platforms 216) and vice versa, regardless of the contact channel (e.g., voice calls, email, live chat or instant message, short message service (SMS), social media platforms, video calls, web forms, mobile Apps) executed by the end user. The common framework 206 may facilitate dynamic service translation (e.g., API, events, agent control commands, call control commands) or data translation (e.g., a key-value pair or a contact attached variable).

In an example, the agent device 202 is a plurality of agent devices. Each agent device of the plurality of agent devices 202 may connect to only one routing platform of the two or more routing platforms 216 at a time. In another example, each agent device of the plurality of agent devices 202 may connect to one or more routing platforms of the two or more routing platforms 216 at a time.

Each routing platform of the two or more routing platforms 216 may be independent from each other and may be from a different vendor (e.g., Azure™, Okta®, Five9®, or the like) and use a different technology from each other.

In operation 224, the integration services server 208, using the security service 210, authenticates the agent device 202. In response to the security service 210 authenticating the agent device 202, the security service 210 generates an authentication token associated with the agent device 202. The security service 210 may send a response 226 including the authentication token to the agent device 202 via the common framework 206.

In an example, an agent control activity (e.g., an agent login, a change in an agent state) goes through an agent control service 212 at the integration services server. In an example, an interaction control activity (e.g., handling a call, putting a call on hold, transferring a call, or the like) goes through an interaction control service 214.

The login activity is an agent control activity (e.g., an agent is trying to log in, a change to an agent status to be able to handle or service calls in a call center). The common framework 206 may send a login request 228 including the authentication token received with response 226 to the integration services server 208. The integration services server 208 may retrieve, using the agent control service 212, agent information for authentication and authorization from an agent profile (e.g., an agent profile for agent using agent device 102). Based on an agent profile lookup 230, the integration services server 208 may obtain, using the agent control service 212, an agent level or an agent group level. The integration services server 208 may determine 232, using the agent control service 212, to which routing platform of the two or more routing platforms 216 the agent device 202 is to be connected based on the agent level or on the agent group level.

In an example, the agent device 202 sends a login request 228 including the routing platform to which the user device 202 is to be connected.

The integration services server 208 may send, using a respective API and a respective protocol of the determined routing platform, a request 234 to start a session between the agent device 202 and the determined routing platform of the two or more routing platforms 216. The request 234 may include the authentication token. In an example, the integration services server 208, using the agent control service 212, determines that the agent device 202 is to be connected to a first routing platform of the two or more routing platforms 216 (e.g., the first routing platform 116 shown in FIG. 1) and sends the request 234 to the first routing platform 218 using an API and a protocol stack corresponding to the first routing platform 218.

The first routing platform 218 may register the agent device 202 in the first routing platform system and create a session. In response to creating the session, the first routing platform 218 may send a response 236 including a session ID to the integration services server 208. The integration services server may obtain, using the agent control service 212, from the agent profile, a profile metadata including information for loading an individual option or a permission that the agent device 202 may have on the unified agent control interface 204. In an example, the integration services server 208, using the agent control service 212, sends a response 238 to the agent device 202 including a session ID and the obtained profile metadata.

The agent device 202 may complete 240, via the common framework 206, using the session ID, the agent login to the agent control interface 204 for accessing the first routing platform 218. In response to completing the agent login, the agent device using the common framework 206, may compile and present the agent control interface 204 based on the agent profile metadata. In an example, in response to completing the agent login, the agent device 202 sends a request to register an event listener with the first routing platform. The agent device 202, via the common framework 206, may interact with the interaction control service 214 at the integration services server 208 to complete the event listener between the agent device 202 and the first routing platform 218. An event listener is a service that allows a program to respond to a specific event (e.g., an incoming call, an incoming message). The event listener may 'listen' for events and execute an associated code when the event (e.g., an inbound call) is triggered.

In an example, the agent device 202, via the common framework 206, sends a communication protocol (e.g., WebSocket, WebRTC) request for an event listener 242 to the interaction control service 214 at the integration services server 208. To implement the request for the event listener, the interaction control service 214 may use a communication protocol such as WebSocket for real-time communication or a Fetch API for HTTP request. The WebSocket is a communication protocol that provides full-duplex, bidirectional communication channels over a single TCP connection. The WebSocket is designed to work over the same ports as HTTP and HTTPS, making the WebSocket compatible with existing network infrastructure.

In response to receiving the communication protocol request 244, the integration services server 208, via the interaction control service 214, may send a request 246 to establish a connection (e.g., WebSocket connection) to the first routing platform 218 for listening for an incoming event. The first routing platform 218 may send, to the integration services server 208, a response including a handshake 248 (e.g., WebSocket handshake). The integration services server 208 may relay the WebSocket handshake response 250 to the agent device 202. In response to receiving the handshake response 250, the agent device 202 may complete the event listener registration 252 between the agent device 202 and the first routing platform 218.

The event listener is a function or method that waits for a specific event to occur and then executes a predefined action in response. The event listener may be used in the context of web applications, where the event listeners may handle an event related to a network communication, a user input, or a system change. The event listener may allow the agent device 202 to react in real-time to, for example, an event from the routing platform to which the agent device is connected (e.g., first routing platform 218), such as an inbound call or a chat request.

In an example, in response to the agent device 202, via the common framework 206, completing the event listener, the agent device 202 may create an inline frame 254 (e.g., an iFrame) for loading a communication protocol adapter on the common framework 206. After creating the iFrame 254, the agent device 202 may establish a communication adapter 256 (e.g., Web Real-Time Communication (WebRTC) and WebSocket). The agent device 202 may send a request to the integration services server 208, using the communication adapter 256, for changing an agent state to 'ready' 258.

In an example, the communication adapter 256 is a Web Real-Time Communication (WebRTC) and WebSocket. The WebRTC is an open-source project that enables real-time communication capabilities directly in a web browser and a mobile application without the need for a plugin or additional software. WebRTC and WebSocket are complementary technologies that may be used together in a web-based communication system.

In real-time communication, WebRTC may provide peer-to-peer communication (e.g., audio, video, and data) transfer capabilities, and the WebSocket may enable full-duplex, bidirectional communication between the agent and end users. By combining WebRTC and WebSocket, the two or more routing platforms 216 may offer robust, real-time communication capabilities with efficient signaling and control mechanisms.

FIG. 3 is a diagram showing one example of a workflow 300 that may be executed, for example, in the environment of FIG. 1, for exchanging data across multiple independent routing platforms, according to various examples. The workflow 300 of FIG. 3 may occur after the operations of workflow 200 of FIG. 2. The workflow 300 of FIG. 3 may be performed by the devices of FIG. 2 (e.g., the agent device 202, the integration services server 208, or the interaction routing platforms 218). Although shown as separate figures, the workflow 300 may be a continuation of the workflow 200.

FIG. 3 includes an agent device 302, an integration services server 308, and two or more routing platforms 314 separate from the integration services server 308 and separate from each other. The agent device 302 may be the agent device 202 of FIG. 2, the integration services server 308 may be the integration services server 208 of FIG. 2, and the interaction routing platforms 314 may be the interaction routing platforms 218 of FIG. 2.

In an example, the agent device 302 is connected to a first routing platform 316 of the two or more routing platforms 314, and a listener event is registered between the first routing platform 316 and the agent device 302. At the agent device 302, the agent control interface 304 may send a request 318 to the common framework 306, using a communication protocol adapter (e.g., adapter 256), for changing an agent state to 'ready.' A change of an agent state is an agent activity controlled by the agent control service 310 at the integration services server 308. The agent device 302, using the common framework 306, may interact with the agent control service 310 to complete the change of the agent state to 'ready.' The common framework 306, while interacting with the agent control service 310, may execute a respective command set recognized by the first routing platform 316 for the agent state change.

In response to receiving the request 318 for changing the agent state at the common framework 306, the agent device 302 may send a request 320 to update agent state status to the agent control service 310 at the integration services server 308. The agent control service 310 may relay the request for agent state status update 322 to the first routing platform 316. The first routing platform 316 may send a response 324 with agent state status to the agent control service 310. The agent control service 310 may relay a response 326 with agent state status to the agent device 302. In response to receiving the response 326 with agent state status, the agent device 302 may complete, using the common framework 306, the change of the agent state status to 'ready' 328. As a result of the change of the agent state status to 'ready,' the agent device 302 is ready to react to inbound events at first routing platform 316.

In an example, after the agent state status is set to 'ready,' the first routing platform 316 receives an inbound call event 330 and the agent device 302 is notified on the inbound voice interaction for appropriate action (e.g., accept or reject that interaction).

Handling a call is an interaction control that goes through the interaction control service 312. The interaction control service 312 may receive, from the first routing platform 316, the inbound call event 332 and may relay the inbound call event 334 to the agent device 302. In response to receiving the relayed inbound call event 334, the agent device 302, using the common framework 306, may send an event ringing 336 to the unified agent control interface 304 at the agent device 302 (e.g., notify the agent on the inbound voice event for appropriate action).

In an example, the agent device 302 accepts the inbound voice interaction (e.g., the agent clicks on an accept button at an agent control interface 304). The agent device 302 executes required commands with the first routing platform 316 to accept the inbound call and establish a session between the agent device 302 and a customer who made the inbound call.

The agent control interface 304 at the agent device 302 may send an answer call command 338 to the common framework 306. The common framework 306 may send an answer call request 340 to the interaction control services 312. The interaction control service 312 may relay the answer call request 342 to the first routing platform 316. In response to receiving the answer call request 342, the first routing platform 316 may send a call established events 344 to the interaction control service 312. The interaction control service 312 may relay the call established event 346 to the common framework 306. In response to receiving the call established event 346, the common framework 306 may establish the call 348 between the agent device 302 and the customer who initiated the call.

Figure 4:
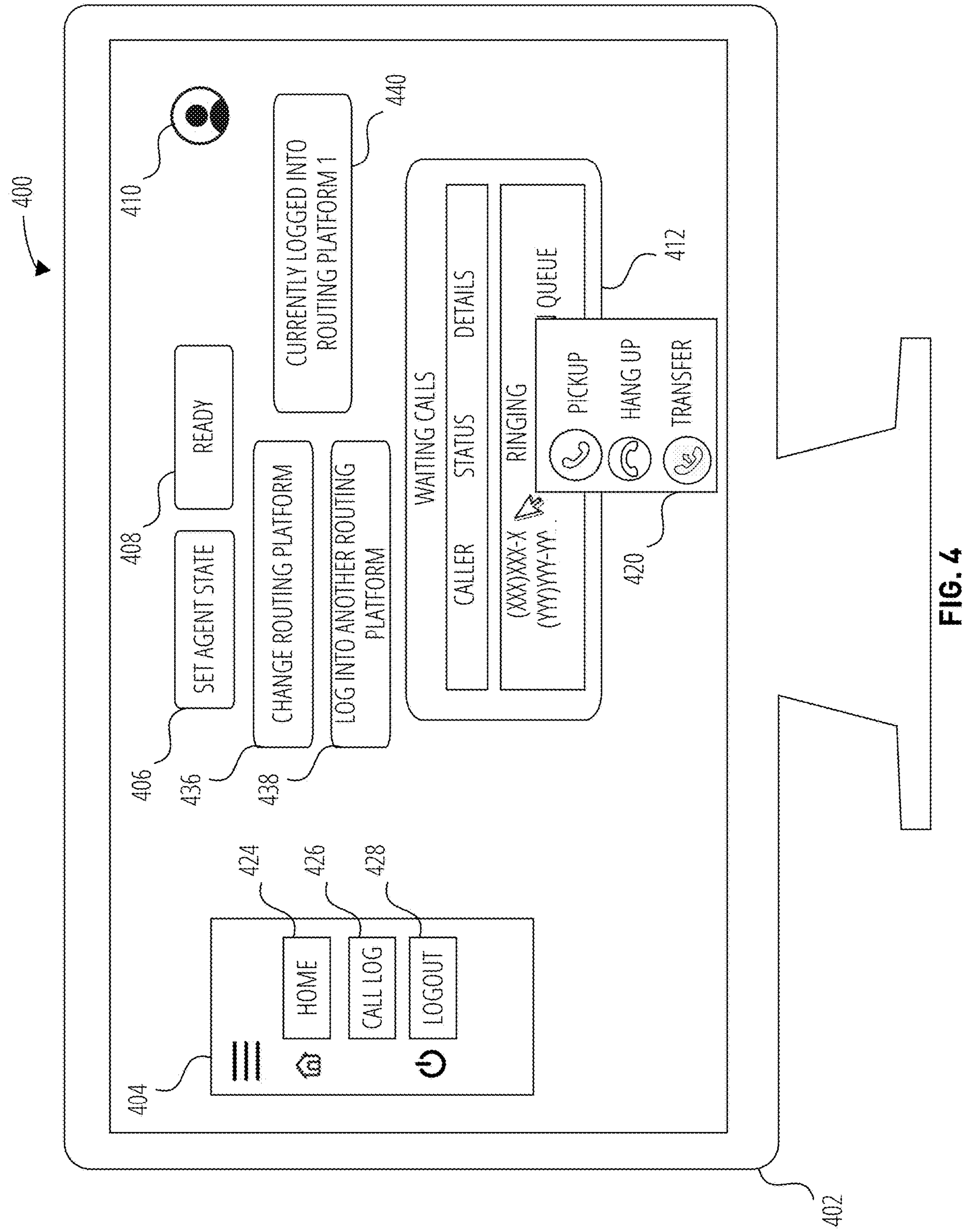
FIG. 4 illustrates a unified agent control interface including a selectable agent control activity button and an interaction control activity button, in accordance with some examples.

FIG. 4 illustrates a unified agent control interface 400 for accessing two or more routing platforms, according to some examples. The unified agent control interface 400 may be displayed in an agent device 402. The unified agent control interface 400 may be used to control an agent control activity (e.g., an agent logon, a change on an agent state) or an interaction control activity (e.g., answering a call, transferring a call, hanging up a call). The unified agent control interface 400 includes an example customer service application that may be used to logout, to change an agent state status, to interact with an incoming call (e.g., pick up the call, hang up the call, transfer the call), or the like. In some examples, the unified agent control interface 400 may display a different application, a webpage, or the like.

The unified agent control interface 400 includes various user interface components, such as selectable options for a customer service agent. The position of the various user interface components displayed on the unified agent control interface 400 may vary. The selectable options for customer service 420 may include selectable options to pick up a call, hang up a call, transfer a call, or the like.

The unified agent control interface 400 may include a menu 404 including a home button 424, a call log button 426, and a logout selectable action button 428. The home button 424, when selected, displays a main page of the customer service application. The call log button, when selected, may display a call history log of an agent or a group of agents. The logout selectable action button 428, when selected, may end a session between the agent device 402 and a routing platform.

The unified agent control interface 400 may include an agent state selectable menu 406 for setting a status of an agent state. The agent state status may include at least one of not ready, ready, or on break.

The unified agent control interface 400 may display a current agent state status 408. The unified agent control interface 400 may include an agent profile button 410. The agent profile button 410, when selected, may include a configuration setting for the agent interface.

In an example, the agent device 402 may be connected to a first routing platform of two or more routing platforms of a unified agent control system. The unified agent control interface 400 may be based on an interaction activity available at the first routing platform.

The unified agent control interface 400 may include a waiting call list 412. Each call in the waiting call list 412 may include a selectable action button menu 420. The selectable action button menu 420 may include a pickup call action button, a hang up call action button, a transfer call action button, or the like.

In an example, the unified agent control interface 400 includes an indication of what platform the agent is currently logged into at currently logged into platform 1 440. The platform may be changed using a change platform selectable indication 436. When selected, the change platform selectable indication 436 may switch the agent from a first platform to a second platform. In some examples, the current agent state status 408 may indicate a status for two or more platforms. For example, an agent may be paused on a first platform and active or ready on a second platform. That is, an agent may be logged into multiple platforms but only active on a single platform at a time.

When selected, a log into another platform selectable indication 438 may log the agent out of the current platform 1, may allow the agent to log into a new platform (e.g., without logging the agent out of platform 1), may change the current agent state status 408 from ready to paused, or the like. When selected, the log into another platform selectable indication 438 may automatically log the agent into a new platform without needing to reauthenticate the agent directly (e.g., without the agent needing to provide any credentials manually). Automatically logging the agent into the new platform may rely on a stored authentication token based on an initial login by the agent to the unified agent control interface 400.

Figure 5:
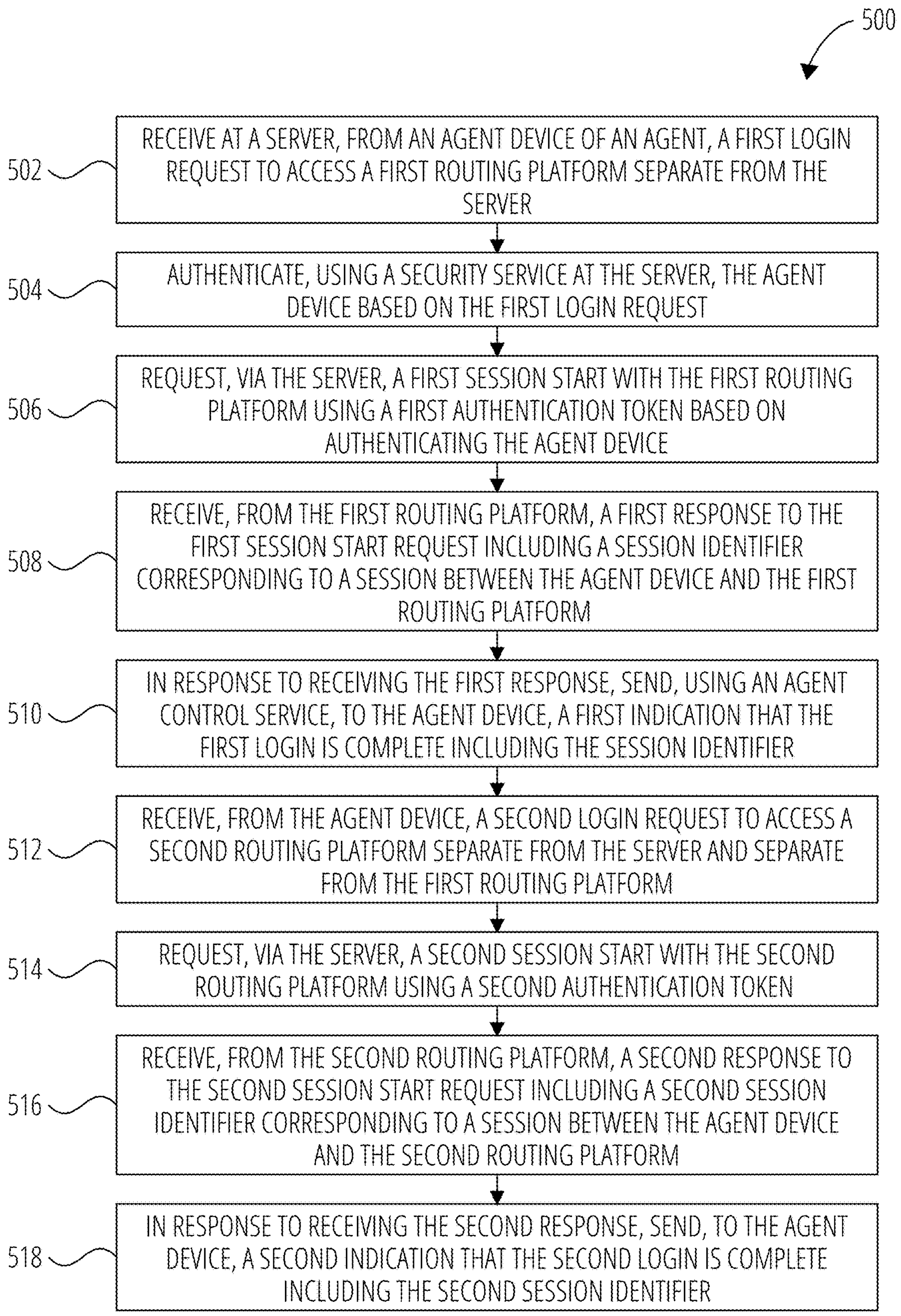
FIG. 5 illustrates a flowchart showing a technique for using a unified agent control interface, in accordance with some examples.

FIG. 5 is a flowchart illustrating technique 500, according to various examples. In an example, operations of technique 500 may be performed by processing circuitry, for example, by executing instructions stored in memory. The processing circuitry may include a processor, a system on a chip, or other circuitry (e.g., wiring). For example, technique 500 may be performed by processing circuitry of a device (or one or more hardware or software components thereof), such as those illustrated and described with reference to FIG. 6.

The technique 500 includes an operation 502 to receive, at a server, from an agent device, a first login request to access a first routing platform separate from the server.

The technique 500 includes an operation 504 to authenticate, using a security service at the server, the agent device based on the first login request.

The technique 500 includes an operation 506 to request, via the server, a first session start with the first routing platform using a first authentication token based on authenticating the agent device.

The technique 500 includes an operation 508 to receive, from the first routing platform, a first response to the first session start request including a session identifier corresponding to a session between the agent device and the first routing platform.

The technique 500 includes an operation 510 to, in response to receiving the first response, send, using an agent control service, to the agent device, a first indication that the first login is complete including the session identifier.

The technique 500 includes an operation 512 to receive, from the agent device, a second login request to access a second routing platform separate from the server and separate from the first routing platform. In an example, the first routing platform and the second routing platform have a different technology type from each other. The routing platform technology type may include at least one of an automatic call distribution (ACD), an omni-channel routing, an artificial intelligence (AI) powered routing, a skills-based routing, an interactive voice response (IVR) routing, workforce management integration, or real-time adaptive routing.

The technique 500 includes an operation 514 to request, via the server, a second session start with the second routing platform using a second authentication token. In an example, the second authentication token is the first authentication token. Operation 514 may include requesting the second session start with the second routing platform without reauthenticating the agent device. Operation 514 may include logging the agent device out of the first platform before requesting the second session start with the second routing platform.

The technique 500 includes an operation 516 to receive, from the second routing platform, a second response to the second session start request including a second session identifier corresponding to a session between the agent device and the second routing platform.

The technique 500 includes an operation 518 to, in response to receiving the second response, send, to the agent device, a second indication that the second login is complete including the second session identifier.

In an example, the technique 500, in response to sending the second indication that the second login is complete, receives, at the server, from the agent device, a request to an event listener registration between the agent device and the second routing platform. The technique 500 may request, via the server, the event listener registration with the second routing platform using a communication protocol. The technique 500 may receive, from the second routing platform, a communication protocol handshake with the second routing platform response. The technique 500 may, in response to receiving the communication protocol handshake with the second routing platform response, send a fourth indication to the agent device that the event listener between the agent device and the second routing platform is complete. Completing an event listener may include monitoring the second routing platform for an incoming event and executing an associated code when the incoming event is triggered. The incoming event may include an inbound call.

In an example, technique 500 receives, from the agent device, a request to change an agent state of the agent to ready for reacting to incoming events at the second routing platform. The technique 500 may send, to the second routing platform, a request to update the agent state to ready.

The technique 500 may receive, from the second routing platform, a response including an agent state status. The technique 500 may send, to the agent device, a fifth indication that the change of the agent state to ready is complete including the agent state status. The technique 500 may receive an inbound call event from the second routing platform. The technique 500 may, in response to receiving the inbound call, send, to the agent device, the inbound call event of an end user occurring at the second routing platform.

In an example, technique 500 receives an answer call request from the agent device. The technique 500 may send the answer call request to the second routing platform. The technique 500 may, in response to sending the answer call request, receive a call established event from the second routing platform. The technique 500 may, in response to receiving the call established event, establishing a call between the agent device and the end user.

In an example, technique 500 may receive, at the server, from a second agent device of a second agent, a third login request to access the first routing platform. The technique 500 may authenticate, using the security service at the server, the second agent device based on the third login request. The technique 500 may request, via the server, a third session start with the first routing platform using a third authentication token based on authenticating the second agent device. The technique 500 may receive, from the first routing platform, a third response to the third session start request including a third session identifier corresponding to a session between the second agent device and the first routing platform. The technique 500 may, in response to receiving the third response, send, to the second agent device, a sixth indication that the third login is complete. The sixth indication may include the third session identifier.

Figure 6:
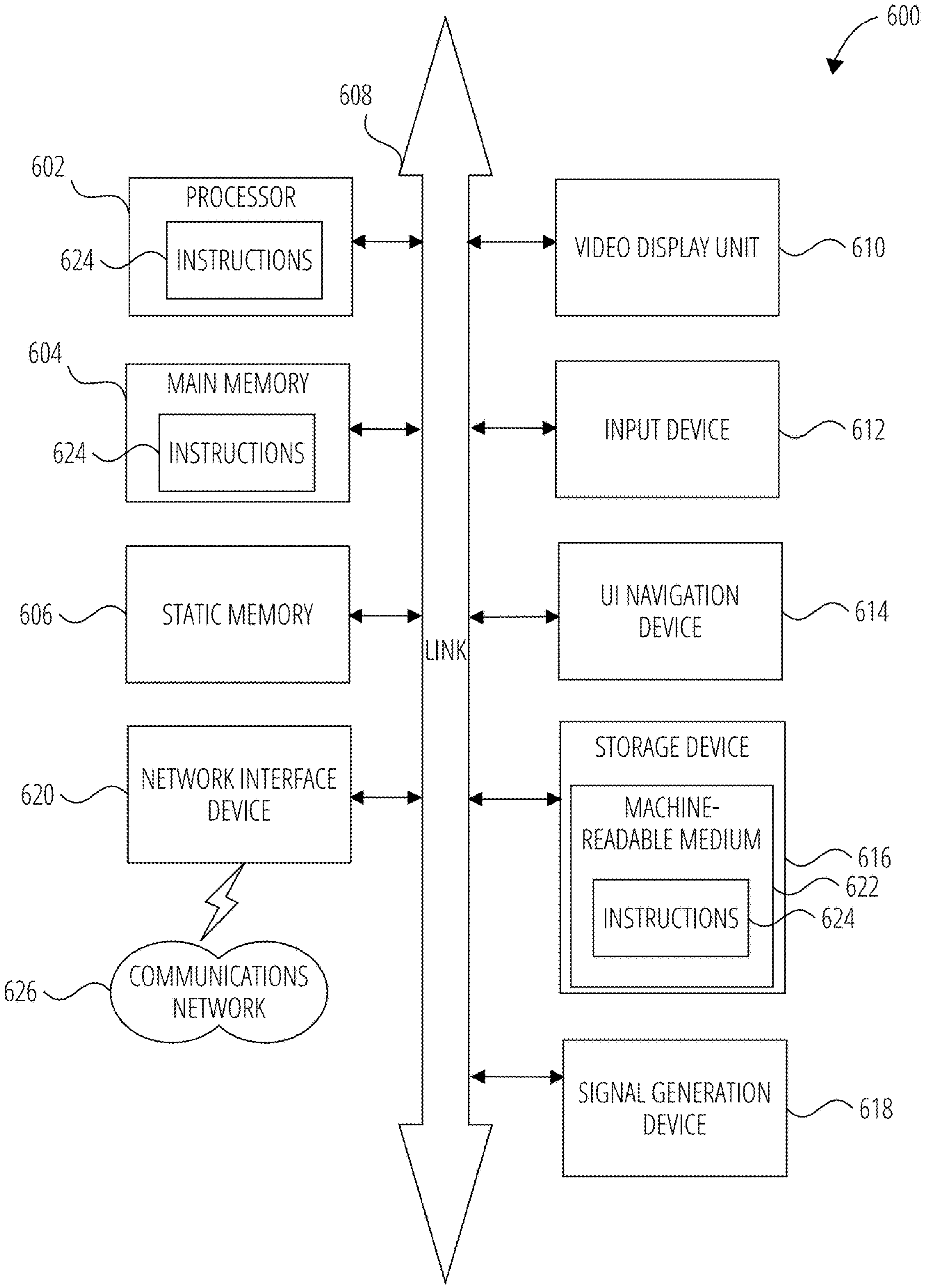
FIG. 6 is a block diagram of a machine upon which any one or more of the techniques discussed herein may perform, in accordance with some examples.

FIG. 6 is a block diagram illustrating a machine in the example form of computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, workstation, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, or the like), a main memory 604, and a static memory 606, which communicate with each other via a link 608. The computer system 600 may further include a video display unit 610, an input device 612 (e.g., a keyboard), and a user interface UI navigation device 614 (e.g., a mouse). In one embodiment, the video display unit 610, input device 612, and UI navigation device 614 are incorporated into a single device housing such as a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensors.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, the static memory 606, and/or within the processor 602 during execution thereof by the computer system 600, with the main memory 604, the static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding, or carrying instructions for execution by the machine and that causes the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 622 that excluded transitory signals.

The instructions 624 may further be transmitted or received over a communications network 626 using a transmission medium via the network interface device 620 utilizing any one of a number of well-known transfer protocols (e.g., HTTP). Examples of communication networks include a Local Area Network (LAN), a Wide Area Network (WAN), the Internet, mobile telephone networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Each of these non-limiting examples may stand on its own, or may be combined in various permutations or combinations with one or more of the other examples.

Example 1 is a method comprising: receiving, at a server, from an agent device of an agent, a first login request to access a first routing platform separate from the server; authenticating, using a security service at the server, the agent device based on the first login request; requesting, via the server, a first session start with the first routing platform using a first authentication token based on authenticating the agent device; receiving, from the first routing platform, a first response to the first session start request including a session identifier corresponding to a session between the agent device and the first routing platform; in response to receiving the first response, sending, using an agent control service, to the agent device, a first indication that the first login is complete including the session identifier; receiving, from the agent device, a second login request to access a second routing platform separate from the server and separate from the first routing platform; requesting, via the server, a second session start with the second routing platform using a second authentication token; receiving, from the second routing platform, a second response to the second session start request including a second session identifier corresponding to a session between the agent device and the second routing platform; and in response to receiving the second response, sending, to the agent device, a second indication that the second login is complete including the second session identifier.

In Example 2, the subject matter of Example 1 includes, wherein the second authentication token is the first authentication token.

In Example 3, the subject matter of Examples 1-2 includes, wherein requesting the second session start with the second routing platform includes requesting the second session start with the second routing platform without reauthenticating the agent device.

In Example 4, the subject matter of Examples 1-3 includes, wherein requesting the second session start with the second routing platform includes logging the agent device out of the first platform before requesting the second session start with the second routing platform.

In Example 5, the subject matter of Examples 1-4 includes, wherein the first routing platform and the second routing platform have a different technology type from each other, the technology type of each including at least one of an automatic call distribution (ACD), an omni-channel routing, an artificial intelligence (AI) powered routing, a skills-based routing, an interactive voice response (IVR) routing, workforce management integration, or real-time adaptive routing.

In Example 6, the subject matter of Examples 1-5 includes, in response to sending the second indication that the second login is complete, receiving, at the server, from the agent device, a request to an event listener registration between the agent device and the second routing platform; requesting, via the server, the event listener registration with the second routing platform using a communication protocol; receiving, from the second routing platform, a communication protocol handshake with the second routing platform response; and in response to receiving the communication protocol handshake with the second routing platform response, sending a fourth indication to the agent device that the event listener between the agent device and the second routing platform is complete, wherein completing an event listener includes monitoring the second routing platform for an incoming event and executing an associated code when the incoming event is triggered, the incoming event including an inbound call.

In Example 7, the subject matter of Example 6 includes, receiving, from the agent device, a request to change an agent state of the agent to ready for reacting to incoming events at the second routing platform; sending, to the second routing platform, a request to update the agent state to ready;

receiving, from the second routing platform, a response including an agent state status; sending, to the agent device, a fifth indication that the change of the agent state to ready is complete including the agent state status; receiving an inbound call event from the second routing platform; and in response to receiving the inbound call, sending, to the agent device, the inbound call event of an end user occurring at the second routing platform.

In Example 8, the subject matter of Example 7 includes, receiving an answer call request from the agent device; sending the answer call request to the second routing platform; in response to sending the answer call request, receiving a call established event from the second routing platform; and in response to receiving the call established event, establishing a call between the agent device and the end user.

In Example 9, the subject matter of Examples 1-8 includes, receiving, at the server, from a second agent device of a second agent, a third login request to access the first routing platform; authenticating, using the security service at the server, the second agent device based on the third login request; requesting, via the server, a third session start with the first routing platform using a third authentication token based on authenticating the second agent device; receiving, from the first routing platform, a third response to the third session start request including a third session identifier corresponding to a session between the second agent device and the first routing platform; and in response to receiving the third response, sending, to the second agent device, a sixth indication that the third login is complete including the third session identifier.

Example 10 is a system comprising: processing circuitry; and memory comprising instructions, which when executed by the processing circuitry configure the processing circuitry to perform operations comprising: receiving, at a server, from an agent device of an agent, a first login request to access a first routing platform separate from the server; authenticating, using a security service at the server, the agent device based on the first login request; requesting, via the server, a first session start with the first routing platform using a first authentication token based on authenticating the agent device; receiving, from the first routing platform, a first response to the first session start request including a session identifier corresponding to a session between the agent device and the first routing platform; in response to receiving the first response, sending, using an agent control service, to the agent device, a first indication that the first login is complete including the session identifier; receiving, from the agent device, a second login request to access a second routing platform separate from the server and separate from the first routing platform; requesting, via the server, a second session start with the second routing platform using a second authentication token; receiving, from the second routing platform, a second response to the second session start request including a second session identifier corresponding to a session between the agent device and the second routing platform; and in response to receiving the second response, sending, to the agent device, a second indication that the second login is complete including the second session identifier.

In Example 11, the subject matter of Example 10 includes, wherein the second authentication token is the first authentication token.

In Example 12, the subject matter of Examples 10-11 includes, wherein the operations further include requesting the second session start with the second routing platform includes requesting the second session start with the second routing platform without reauthenticating the agent device.

In Example 13, the subject matter of Examples 10-12 includes, wherein the operations further include requesting the second session start with the second routing platform includes logging the agent device out of the first platform before requesting the second session start with the second routing platform.

In Example 14, the subject matter of Examples 10-13 includes, wherein the operations further include: receiving, at the server, from a second agent device of a second agent, a third login request to access the first routing platform; authenticating, using the security service at the server, the second agent device based on the third login request; requesting, via the server, a third session start with the first routing platform using a third authentication token based on authenticating the second agent device; receiving, from the first routing platform, a third response to the third session start request including a third session identifier corresponding to a session between the second agent device and the first routing platform; and in response to receiving the third response, sending, to the second agent device, a sixth indication that the third login is complete including the third session identifier.

Example 15 is a non-transitory machine-readable medium comprising instructions, which when executed by processing circuitry, configure the processing circuitry to perform operations comprising: receiving, at a server, from an agent device of an agent, a first login request to access a first routing platform separate from the server; authenticating, using a security service at the server, the agent device based on the first login request; requesting, via the server, a first session start with the first routing platform using a first authentication token based on authenticating the agent device; receiving, from the first routing platform, a first response to the first session start request including a session identifier corresponding to a session between the agent device and the first routing platform; in response to receiving the first response, sending, using an agent control service, to the agent device, a first indication that the first login is complete including the session identifier; receiving, from the agent device, a second login request to access a second routing platform separate from the server and separate from the first routing platform; requesting, via the server, a second session start with the second routing platform using a second authentication token; receiving, from the second routing platform, a second response to the second session start request including a second session identifier corresponding to a session between the agent device and the second routing platform; and in response to receiving the second response, sending, to the agent device, a second indication that the second login is complete including the second session identifier.

In Example 16, the subject matter of Example 15 includes, wherein the second authentication token is the first authentication token.

In Example 17, the subject matter of Examples 15-16 includes, wherein the operations further include requesting the second session start with the second routing platform includes requesting the second session start with the second routing platform without reauthenticating the agent device.

In Example 18, the subject matter of Examples 15-17 includes, wherein the operations further include requesting the second session start with the second routing platform includes logging the agent device out of the first platform before requesting the second session start with the second routing platform.

In Example 19, the subject matter of Examples 15-18 includes, wherein the first routing platform and the second routing platform have a different technology type from each other, the technology type of each including at least one of an automatic call distribution (ACD), an omni-channel routing, an artificial intelligence (AI) powered routing, a skills-based routing, an interactive voice response (IVR) routing, workforce management integration, or real-time adaptive routing.

In Example 20, the subject matter of Examples 15-19 includes, wherein the operations further include: receiving, at the server, from a second agent device of a second agent, a third login request to access the first routing platform; authenticating, using the security service at the server, the second agent device based on the third login request; requesting, via the server, a third session start with the first routing platform using a third authentication token based on authenticating the second agent device; receiving, from the first routing platform, a third response to the third session start request including a third session identifier corresponding to a session between the second agent device and the first routing platform; and in response to receiving the third response, sending, to the second agent device, a sixth indication that the third login is complete including the third session identifier.

Example 21 is a method comprising: sending, to a server, a first login request to access a first routing platform separate from the server; receiving, from the server, a first indication that the first login is complete including a first agent profile metadata and a first session ID corresponding to a first session with the first routing platform; in response to receiving the first indication that the first login is complete, presenting an agent control interface based on the first agent profile metadata; sending, to the server, a second login request to access a second routing platform separate from the server and separate from the first routing platform; receiving, from the server, a second indication that the second login is complete including a second agent profile metadata and a second session ID corresponding to a second session with the second routing platform; and in response to receiving the second indication that the second login is complete, presenting the agent control interface based on the second agent profile metadata.

In Example 22, the subject matter of Example 21 includes, in response to sending, to the server, the second login request, receiving a third indication that a log-off from the first routing platform is complete.

In Example 23, the subject matter of Examples 21-22 includes, in response to receiving the first indication that the first login is complete, requesting to complete an event listener with the first routing platform for monitoring the first routing platform for an incoming event; in response to receiving a fourth indication that the event listener is complete, sending, to the server, a request to change an agent state to ready for reacting to incoming events at first routing platform; and receiving, from the server, a fifth indication that the change of the agent state to ready is complete.

In Example 24, the subject matter of Examples 21-23 includes, receiving, from the server, an event ringing corresponding to an inbound call event at the first routing platform; sending, to the server, an answer call request; and receiving a sixth indication that the inbound call was established with an end user.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24.

Example 27 is a system to implement of any of Examples 1-24.

Example 28 is a method to implement of any of Examples 1-24.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include but are not limited to, hard disks, removable magnetic disks, removable optical disks (e.g., compact disks and digital video disks), magnetic cassettes, memory cards or sticks, random access memories (RAMs), read-only memories (ROMs), and the like.

What is claimed is:

1. A method comprising:

receiving, at a server, from an agent device of an agent, a first login request to access a first routing platform separate from the server;

authenticating, using a security service at the server, the agent device based on the first login request;

requesting, via the server, a first session start with the first routing platform using a first authentication token based on authenticating the agent device;

receiving, from the first routing platform, a first response to the first session start request including a session identifier corresponding to a session between the agent device and the first routing platform;

in response to receiving the first response, sending, using an agent control service, to the agent device, a first indication that the first login request is complete including the session identifier;

receiving, from the agent device, a second login request to access a second routing platform separate from the server and separate from the first routing platform;

requesting, via the server, a second session start with the second routing platform using a second authentication token;

receiving, from the second routing platform, a second routing platform response to the second session start request including a second session identifier corresponding to a second session between the agent device and the second routing platform;

in response to receiving the second routing platform response, sending, to the agent device, a second indication that the second login request is complete including the second session identifier;

in response to sending the second indication that the second login request is complete, receiving, at the server, from the agent device, a request to an event listener registration between the agent device and the second routing platform;

requesting, via the server, the event listener registration with the second routing platform using a communication protocol;

receiving, from the second routing platform, a communication protocol handshake with the second routing platform response; and in response to receiving the communication protocol handshake with the second routing platform response, sending a fourth indication to the agent device that the event listener registration between the agent device and the second routing platform is complete, wherein completing the event listener registration includes monitoring the second routing platform for an incoming event and executing an associated code when the incoming event is triggered, the incoming event including an inbound call.

2. The method of claim 1, wherein the second authentication token is the first authentication token.

3. The method of claim 1, wherein requesting the second session start with the second routing platform includes requesting the second session start with the second routing platform without reauthenticating the agent device.

4. The method of claim 1, wherein requesting the second session start with the second routing platform includes logging the agent device out of the first routing platform before requesting the second session start with the second routing platform.

5. The method of claim 1, wherein the first routing platform and the second routing platform have a different technology type from each other, the technology type of each including at least one of an automatic call distribution (ACD), an omni-channel routing, an artificial intelligence (AI) powered routing, a skills-based routing, an interactive voice response (IVR) routing, workforce management integration, or real-time adaptive routing.

6. The method of claim 1, further comprising:

receiving, from the agent device, a request to change an agent state of the agent to ready for reacting to incoming events at the second routing platform;

sending, to the second routing platform, a request to update the agent state to ready;

receiving, from the second routing platform, a response including an agent state status;

sending, to the agent device, a fifth indication that the change of the agent state to ready is complete including the agent state status;

receiving an inbound call event from the second routing platform; and in response to receiving the inbound call, sending, to the agent device, the inbound call event of an end user occurring at the second routing platform.

7. The method of claim 6, further comprising:

receiving an answer call request from the agent device;

sending the answer call request to the second routing platform;

in response to sending the answer call request, receiving a call established event from the second routing platform; and in response to receiving the call established event, establishing a call between the agent device and the end user.

8. The method of claim 1, further comprising:

receiving, at the server, from a second agent device of a second agent, a third login request to access the first routing platform;

authenticating, using the security service at the server, the second agent device based on the third login request;

requesting, via the server, a third session start with the first routing platform using a third authentication token based on authenticating the second agent device;

receiving, from the first routing platform, a third response to the third session start request including a third session identifier corresponding to a session between the second agent device and the first routing platform; and in response to receiving the third response, sending, to the second agent device, a sixth indication that the third login is complete including the third session identifier.

9. A system comprising:

processing circuitry; and memory comprising instructions, which when executed by the processing circuitry configure the processing circuitry to perform operations comprising:

receiving, at a server, from an agent device of an agent, a first login request to access a first routing platform separate from the server;

authenticating, using a security service at the server, the agent device based on the first login request;

requesting, via the server, a first session start with the first routing platform using a first authentication token based on authenticating the agent device;

receiving, from the first routing platform, a first response to the first session start request including a session identifier corresponding to a session between the agent device and the first routing platform;

in response to receiving the first response, sending, using an agent control service, to the agent device, a first indication that the first login is complete including the session identifier;

receiving, from the agent device, a second login request to access a second routing platform separate from the server and separate from the first routing platform;

requesting, via the server, a second session start with the second routing platform using a second authentication token;

receiving, from the second routing platform, a second response to the second session start request including a second session identifier corresponding to a session between the agent device and the second routing platform;

in response to receiving the second response, sending, to the agent device, a second indication that the second login is complete including the second session identifier;

in response to sending the second indication that the second login request is complete, receiving, at the server, from the agent device, a request to an event listener registration between the agent device and the second routing platform;

requesting, via the server, the event listener registration with the second routing platform using a communication protocol;

receiving, from the second routing platform, a communication protocol handshake with the second response; and in response to receiving the communication protocol handshake with the second response, sending a fourth indication to the agent device that the event listener registration between the agent device and the second routing platform is complete, wherein completing the event listener registration includes monitoring the second routing platform for an incoming event and executing an associated code when the incoming event is triggered, the incoming event including an inbound call.

10. The system of claim 9, wherein the second authentication token is the first authentication token.

11. The system of claim 9, wherein the operations further include requesting the second session start with the second routing platform includes requesting the second session start with the second routing platform without reauthenticating the agent device.

12. The system of claim 9, wherein the operations further include requesting the second session start with the second routing platform includes logging the agent device out of the first routing platform before requesting the second session start with the second routing platform.

13. The system of claim 9, wherein the operations further include:

receiving, at the server, from a second agent device of a second agent, a third login request to access the first routing platform;

authenticating, using the security service at the server, the second agent device based on the third login request;

requesting, via the server, a third session start with the first routing platform using a third authentication token based on authenticating the second agent device;

receiving, from the first routing platform, a third response to the third session start request including a third session identifier corresponding to a session between the second agent device and the first routing platform; and in response to receiving the third response, sending, to the second agent device, a sixth indication that the third login is complete including the third session identifier.

14. A non-transitory machine-readable medium comprising instructions, which when executed by processing circuitry, configure the processing circuitry to perform operations comprising:

receiving, at a server, from an agent device of an agent, a first login request to access a first routing platform separate from the server;

authenticating, using a security service at the server, the agent device based on the first login request;

requesting, via the server, a first session start with the first routing platform using a first authentication token based on authenticating the agent device;

receiving, from the first routing platform, a first response to the first session start request including a session identifier corresponding to a session between the agent device and the first routing platform;

in response to receiving the first response, sending, using an agent control service, to the agent device, a first indication that the first login is complete including the session identifier;

receiving, from the agent device, a second login request to access a second routing platform separate from the server and separate from the first routing platform;

requesting, via the server, a second session start with the second routing platform using a second authentication token;

receiving, from the second routing platform, a second response to the second session start request including a second session identifier corresponding to a session between the agent device and the second routing platform; and in response to receiving the second response, sending, to the agent device, a second indication that the second login is complete including the second session identifier;

in response to sending the second indication that the second login request is complete, receiving, at the server, from the agent device, a request to an event listener registration between the agent device and the second routing platform;

requesting, via the server, the event listener registration with the second routing platform using a communication protocol;

receiving, from the second routing platform, a communication protocol handshake with the second response; and in response to receiving the communication protocol handshake with the second response, sending a fourth indication to the agent device that the event listener registration between the agent device and the second routing platform is complete, wherein completing the event listener registration includes monitoring the second routing platform for an incoming event and executing an associated code when the incoming event is triggered, the incoming event including an inbound call.

15. The non-transitory machine-readable medium of claim 14, wherein the second authentication token is the first authentication token.

16. The non-transitory machine-readable medium of claim 14, wherein the operations further include requesting the second session start with the second routing platform includes requesting the second session start with the second routing platform without reauthenticating the agent device.

17. The non-transitory machine-readable medium of claim 14, wherein the operations further include requesting the second session start with the second routing platform includes logging the agent device out of the first routing platform before requesting the second session start with the second routing platform.

18. The non-transitory machine-readable medium of claim 14, wherein the first routing platform and the second routing platform have a different technology type from each other, the technology type of each including at least one of an automatic call distribution (ACD), an omni-channel routing, an artificial intelligence (AI) powered routing, a skills-based routing, an interactive voice response (IVR) routing, workforce management integration, or real-time adaptive routing.

19. The non-transitory machine-readable medium of claim 14, wherein the operations further include:

receiving, at the server, from a second agent device of a second agent, a third login request to access the first routing platform;

authenticating, using the security service at the server, the second agent device based on the third login request;

requesting, via the server, a third session start with the first routing platform using a third authentication token based on authenticating the second agent device;

receiving, from the first routing platform, a third response to the third session start request including a third session identifier corresponding to a session between the second agent device and the first routing platform; and in response to receiving the third response, sending, to the second agent device, a sixth indication that the third login is complete including the third session identifier.

* * * * *